US009098386B1

(12) United States Patent
Boydell et al.

(10) Patent No.: US 9,098,386 B1
(45) Date of Patent: Aug. 4, 2015

(54) SYSTEM, METHOD, AND COMPUTER PROGRAM FOR DETERMINING A SUBJECTIVE DISTANCE BETWEEN TWO LOCATIONS

(71) Applicant: Amdocs Software Systems Limited, Dublin (IE)

(72) Inventors: Oisin Boydell, Delgany (IE); David Curran, Tyrrelstown (IE); Michael Kerrigan, Rathfarnham (IE)

(73) Assignee: Amdocs Software Systems Limited, Dublin (IE)

( * ) Notice: Subject to any disclaimer, the term of this patent is extended or adjusted under 35 U.S.C. 154(b) by 139 days.

(21) Appl. No.: 13/732,070

(22) Filed: Dec. 31, 2012

(51) Int. Cl.
*G01C 21/26* (2006.01)
*G01C 22/02* (2006.01)
*G01C 21/34* (2006.01)
*G06F 17/00* (2006.01)

(52) U.S. Cl.
CPC .................................... *G06F 17/00* (2013.01)

(58) Field of Classification Search
CPC ........ G01C 21/00; G01C 21/34; G01C 21/30; G01C 1/10; G01C 15/002; G08G 1/00; G08G 1/012; G08G 1/07; G08G 1/16; G08G 1/0968; G08G 1/133; G08G 1/161; G01S 3/04; G01S 3/14; G01S 5/06; G01S 5/02; G06F 3/048; G06F 17/40; G06F 19/00; G06F 17/30241
USPC .......... 701/201, 225, 2, 117, 50, 118, 1, 465, 701/587; 340/905, 901, 933, 436
See application file for complete search history.

(56) References Cited

U.S. PATENT DOCUMENTS

| | | | | |
|---|---|---|---|---|
| 8,036,820 B2 * | 10/2011 | Sera | ............................... | 701/117 |
| 2002/0077748 A1 * | 6/2002 | Nakano | ......................... | 701/209 |
| 2008/0133126 A1 * | 6/2008 | Dupray | .......................... | 701/204 |
| 2009/0063035 A1 * | 3/2009 | Mandel et al. | ................ | 701/202 |
| 2009/0082967 A1 * | 3/2009 | Hara et al. | ...................... | 701/225 |
| 2010/0036601 A1 * | 2/2010 | Ozawa et al. | ................. | 701/201 |
| 2010/0057344 A1 * | 3/2010 | Nezu et al. | .................... | 701/201 |
| 2010/0088012 A1 * | 4/2010 | O'Sullivan et al. | ........... | 701/200 |
| 2010/0131190 A1 * | 5/2010 | Terauchi et al. | .............. | 701/201 |
| 2010/0174479 A1 * | 7/2010 | Golding et al. | ............... | 701/200 |
| 2010/0250059 A1 * | 9/2010 | Sekiyama et al. | .............. | 701/35 |
| 2010/0332118 A1 * | 12/2010 | Geelen et al. | .................. | 701/201 |
| 2011/0153137 A1 * | 6/2011 | Yeom | .............................. | 701/25 |
| 2011/0208429 A1 * | 8/2011 | Zheng et al. | ................... | 701/209 |
| 2011/0224900 A1 * | 9/2011 | Hiruta et al. | .................. | 701/201 |
| 2011/0276257 A1 * | 11/2011 | Zaitsu et al. | .................. | 701/117 |
| 2011/0301832 A1 * | 12/2011 | Zheng et al. | ................... | 701/200 |
| 2012/0058775 A1 * | 3/2012 | Dupray et al. | ............. | 455/456.1 |
| 2012/0226391 A1 | 9/2012 | Fryer et al. | | |
| 2012/0253655 A1 * | 10/2012 | Yamada et al. | ............... | 701/409 |
| 2014/0095132 A1 * | 4/2014 | Fu et al. | ............................ | 703/6 |

OTHER PUBLICATIONS

Montello, D. R., "The Perception and Cognition of Environmental Distance: Direct Sources of Information," Spatial Information Theory: A Theoretical Basis for GIS, 1997, pp. 297-311.

* cited by examiner

*Primary Examiner* — Calvin Cheung
*Assistant Examiner* — Luis A Martinez Borrero
(74) *Attorney, Agent, or Firm* — Zilka-Kotab, PC

(57) ABSTRACT

A system, method, and computer program product are provided for determining a subjective distance between two locations. In use, a first location and a second location are identified. Additionally, a subjective distance between the first location and the second location is determined, utilizing a model.

12 Claims, 4 Drawing Sheets

SYSTEM, METHOD, AND COMPUTER PROGRAM FOR DETERMINING A SUBJECTIVE DISTANCE BETWEEN TWO LOCATIONS

FIELD OF THE INVENTION

The present invention relates to distance calculations, and more particularly to determining a subjective distance.

BACKGROUND

Computing geographic distance between locations is an important element of systems providing location-based services (LBS). For example, the distance between a location and one or more points of interest may be used in determining which points of interest are most pertinent. Unfortunately, conventional methods for performing distance calculations have exhibited various limitations.

For example, a physical distance calculated by a system may not be indicative of additional factors that may substantively alter travel time experienced by a user. There is thus a need for addressing these and/or other issues associated with the prior art.

SUMMARY

A system, method, and computer program product are provided for determining a subjective distance between two locations. In use, a first location and a second location are identified. Additionally, a subjective distance between the first location and the second location is determined, utilizing a model.

DETAILED DESCRIPTION

Figure 1:
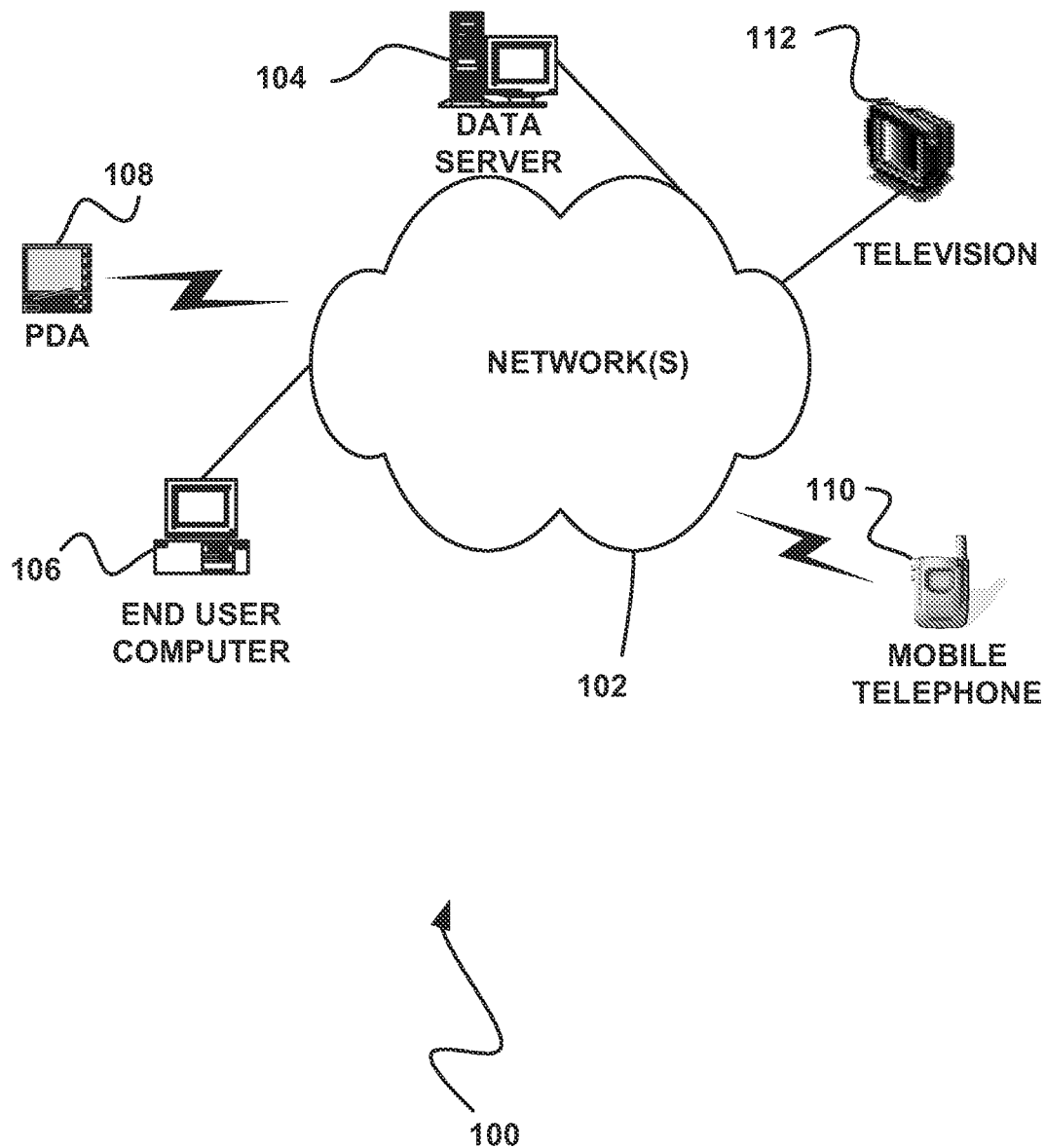
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
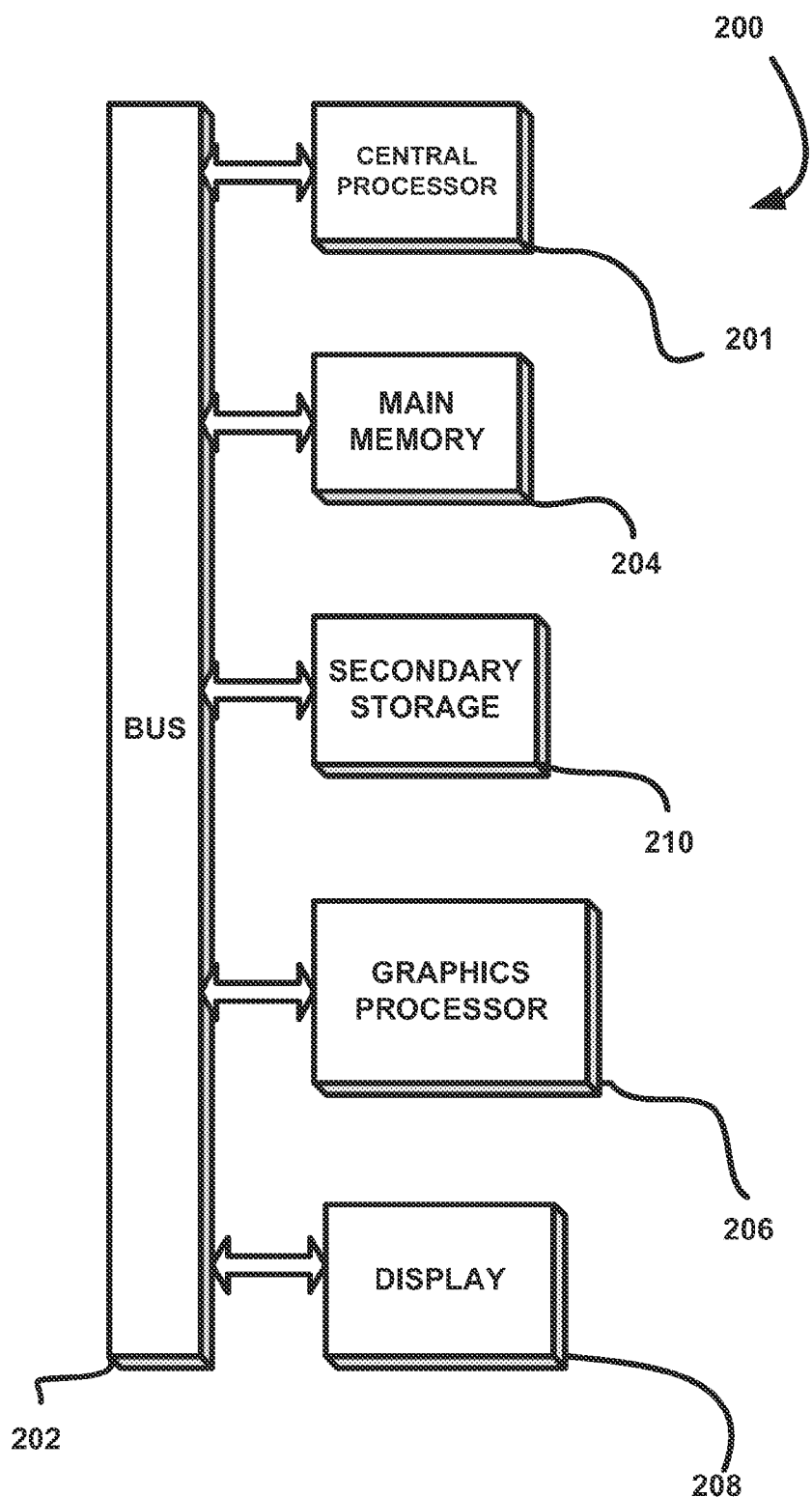
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
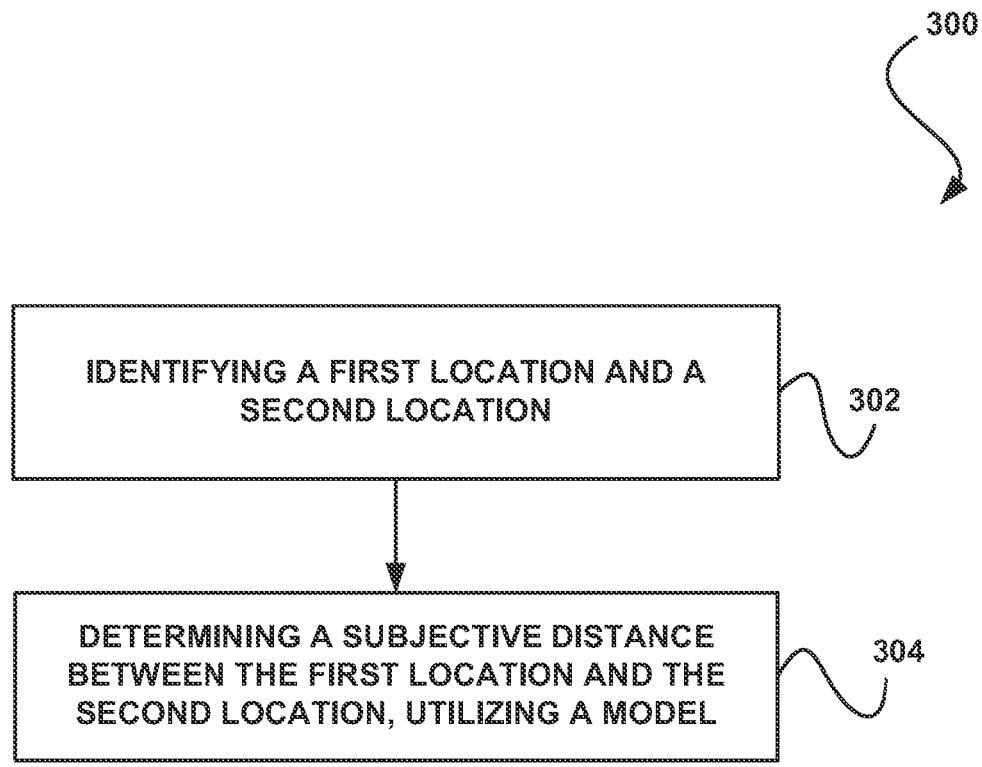
FIG. 3 illustrates a method for determining a subjective distance between two locations, in accordance with one embodiment.

FIG. 3 illustrates a method 300 for determining a subjective distance between two locations, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a first location and a second location are identified. In one embodiment, the first location and the second location may be associated with a query. In another embodiment, the query may include a request for directions. For example, the query may include a request for directions from the first location to the second location. In yet another embodiment, the directions may include walking direction, driving directions, cycling directions, flying directions, etc. In yet another embodiment, the directions may include geographical directions (e.g., directions with respect to a geographical map), street directions (e.g., directions, with respect to a street map), etc.

Additionally, in one embodiment, the query may be created by a user. For example, the user may draft the query using a graphical user interface (GUI) of a device and may submit the query utilizing a network (e.g., a cellular network, a computer network, etc.) associated with the device. In another embodiment, the first location may include a starting location. For example, the first location may include a location from which the user wishes to start a trip. In yet another embodiment, the first location may include a current location of a user. For example, the first location may be determined utilizing a global positioning system (GPS) module connected to a device of the user.

Further, in one embodiment, the second location may include a destination location. For example, the second location may include a destination location selected by the user. In another example, the second location may include one of a plurality of possible destination locations. In another embodiment, the second location may be determined by an application. In yet another embodiment, the second location may be associated with an entity (e.g., an individual, a business, a landmark, etc.).

Further still, in one embodiment, the query may include a request for a route between the first location and the second location. For example, the query may include a request for an optimized route between the first location and the second location. In another embodiment, the query may include a request for a subjective distance between the first location and the second location. In yet another embodiment, the second location may be identified in response to a request for a particular entity or type of entity. For example, the second location may be identified in response to a user request for an identification of a particular type of business close to the first location.

Also, as shown in operation 304, a subjective distance between the first location and the second location is determined, utilizing a model. In one embodiment, the model may include one or more records of past user movement. For example, the model may include one or more records of actual physical movement of one or more users (e.g., the user that made the request, users other than the user that made the request, etc.).

In addition, in one embodiment, the records of past user movement may be determined by capturing location data from one or more sources. For example, each record of past user movement may include a path taken by a user that is determined by capturing user location data from one or more cell towers and cellular phones, one or more global positioning system (GPS) devices and transmitters, one or more wireless network transceivers and network communication devices, etc. In another embodiment, the model may include an aggregation of a plurality of records of past user movement.

Furthermore, in one embodiment, the model may include temporal data (e.g., time-based data, etc.). For example, the model may include time-based data associated with the records of past user movement. For instance, the temporal data may include an amount of time spent performing an instance of past user movement. In another embodiment, the temporal data may include a time (e.g., a time of day, a week of a month, a month of a year, etc.) in which an instance of past user movement occurred.

Further still, in one embodiment, the temporal data may include an indication of any holidays associated with the time in which the instance of past user movement occurred, an indication as to whether it was daytime or nighttime when the instance of past user movement occurred, or any event that may be perceived to have a direct influence on journey time and effort. In another embodiment, temporal data may be associated with each record of past user movement. In yet another embodiment, the model may include weather data. For example, the model may include the weather during each instance of past user movement. In still another embodiment, the weather data may be retrieved from a weather data provider.

Also, in one embodiment, determining the subjective distance between the first location and the second location may include mapping the first location and the second location to the model. For example, determining the subjective distance between the first location and the second location may include comparing the first location and the second location against the model. In another embodiment, determining the subjective distance between the first location and the second location may include calculating a subjective distance for one or more possible routes between the first location and the second location.

Additionally, in one embodiment, determining the subjective distance between the first location and the second location may include determining an amount of time that is spent performing an instance of past user movement between the first location and the second location. For example, determining the subjective distance for a route between the first location and the second location may include determining an average of a plurality of times spent performing each of a plurality of instances of past user movement between the first location and the second location.

In another example, one or more additional factors may be considered when calculating the subjective distance for the route. For example, one or more factors (e.g., a time of day, a weather condition, etc.) may be associated with the query. Additionally, only records of past user movement matching those factors (e.g., having the same time of day, weather condition, etc.) or having attributes within a predetermined range of those factors may be considered when calculating the subjective distance for the route.

In this way, the subjective distance for the route may include an estimated time to travel from the first location to the second location, given historical movement data and temporal data associated with travel from the first location to the second location. In another embodiment, one or more of the records of past user movement may be weighted. For example, one or more of the records of past user movement may be weighted based on popularity (e.g., a number of instances of similar past user movement, etc.).

Further, in one embodiment, the subjective distance with the lowest value from a plurality of possible subjective distances between the first location and the second location may be selected. For example, subjective distances associated with each possible route (or all routes meeting one or more predetermined criteria) from the first location to the second location may be compared to each other, and the route with the smallest subjective distance may be selected.

Further still, in one embodiment, the determined subjective distance may be associated with an optimized route between the first location and the second location. For example, a plurality of routes each with a plurality of possible subjective distances between the first location and the second location may be calculated, and determining the optimized route may include selecting a route from the plurality of routes that has the smallest subjective distance associated with it. In another embodiment, the device of a user may provide records of past user movement to develop the model, and the determined subjective distance may be returned to the user from the device in response to a query by the user entered utilizing the device.

Also, in one embodiment, the determined subjective distance may be used to make one or more recommendations to the user. For example, the determined subjective distance may include a first subjective distance between the first location and the second location, and a second subjective distance may be determined between the first location and a third location. Additionally, the first subjective distance may be compared to the second subjective distance, and the second location may be returned to the user if the first subjective distance is smaller than the second subjective distance, while the third location may be returned to the user if the second subject distance is smaller than the first subjective distance.

Further, in one embodiment, returning the second or third location distance may include recommending the second or third location to the user. For example, the second or third location may be recommended to the user as the location with the smallest subjective distance from the first location. In another embodiment, the second location and the third location may each be associated with a unique business or service, and the first location may be associated with a current location of the user. In this way, a recommendation of a business or service associated with a location having the smallest subjective distance from the location associated with the current location of the user may be determined and returned. Additionally, the subjective distance between the first location and the second location may be considered when determining the optimized route between the locations. Additionally, topographic information may not be required when determining a subjective distance or an optimized route, and such subjective distance and optimized route may be more efficient than a route determined using purely distance-based calculations on a topographic map.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
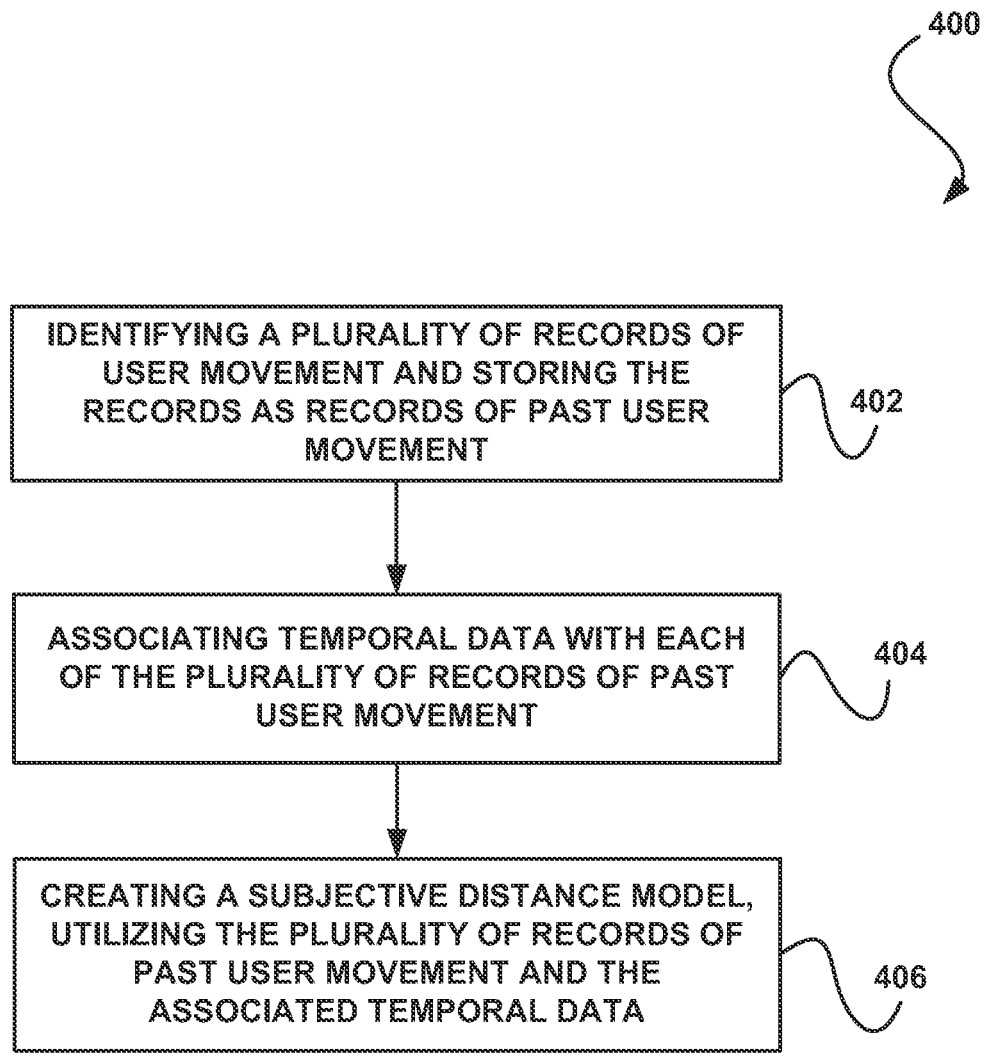
FIG. 4 illustrates a method for generating a subjective distance model, in accordance with one embodiment.

FIG. 4 illustrates a system 400 for generating a subjective distance model, in accordance with one embodiment. As an option, the system 400 may be carried out in the context of the details of FIGS. 1-3. Of course, however, the system 400 may be carried out in any desired environment. Further, the aforementioned definitions may equally apply to the description below.

As shown in operation 402, a plurality of records of user movement is identified and stored as records of past user movement. In one embodiment, each record of user movement may include a record of tracked physical movement of a user with respect to an area map. For example, actual physical movements (e.g., journeys, etc.) of one or more users over time may be tracked. In another embodiment, the plurality of records of user movement may be identified utilizing one or more tracking means.

For example, actual physical movements of one or more users may be tracked by capturing data from positioning sources such as one or more of device movement between cell towers in a mobile network, GPS enabled devices and applications, movement between Wi-Fi hotspots, etc. In yet another embodiment, privacy of the one or more users may be preserved during the tracking. For example, the tracking may be performed anonymously, such that an identity of each user is not retained in associated with that user's physical movements. In still another embodiment, an identity of the one or more users may be obtained and stored securely.

Additionally, as shown in operation 404, temporal data is associated with each of the plurality of records of past user movement. In one embodiment, temporal data may include time-based data relevant to each of the plurality of records of past user movement. For example, the temporal data may include the time taken to travel the distance tracked in each record of past user movement, the time taken to travel a portion of the distance tracked in each record of past user movement, etc.

In another embodiment, the temporal data may be used to determine temporal variations within the records of past user movement, such as different movement patterns during a determined rush hour time period and a determined non-rush hour period, different movement patterns during the night and during the day, different movement patterns during holiday weekends, etc.

Further, as shown in operation 406, a subjective distance model is created, utilizing the plurality of records of past user movement and the associated temporal data. In one embodiment, the plurality of records of past user movement and the associated temporal data may be aggregated to form the subjective distance model. In another embodiment, the subjective distance model may be used to determine a subjective distance between two geographical locations.

For example, the two locations may be determined and mapped against the subjective distance model. In another example, an analysis of the past user movement patterns within the subjective distance model in with respect to the two geographical locations may result in a determination of a subjective distance between the two locations. In another embodiment, the subjective distance may be determined utilizing a navigation system (e.g., an electronic navigation system, navigation system software, connected car initiatives, etc.).

Further still, in one embodiment, one or more queries may be run against the subjective distance model. For example, a query requesting the subjective distance between two geographical locations may be run against the subjective distance model. In another example, the results of the query may be compared against a physical geographical distance between the two geographical locations.

In this way, no topographic information may be required to determine an optimized route between two geographical locations. Additionally, additional factors that influence user journeys may not need to be explicitly measured, since such factors may become latent factors that may be captured implicitly within the subjective distance model, which may model aggregate user movement patterns from journey data in order to deliver subjective distance results between points of interest for location based services.

Further, the subjective distance model may learn from actual movements of individuals and may not be constrained in requiring an accurate up-to-date internal map of a physical space. Instead of trying to interpret and predict how people might traverse a map, the subjective distance model may measure how individuals are actually traversing the physical space which may produce a more realistic movement and proximity model for location based services. Further still, instead of focusing on one or more specific paths, the subjective distance model may analyze overall patterns of movement within a physical space in order to reflect how people move within that physical space.

Also, by learning subjective user travel by observing and aggregating user's everyday movements, the subjective distance model may be used in place of naïve distance metrics and location calculations for location based services to improve their usefulness and utility.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:

identifying by a system including a hardware processor a first location and a second location associated with a query; and identifying and storing by the system records of past physical movement for a plurality of different devices of a plurality of different users, where each record includes a plurality of attributes including:

a time of the past physical movement, an indication of whether the past physical movement associated with the record occurred during a holiday, an indication of whether the past physical movement associated with the record occurred during daytime or nighttime, and an indication of a plurality of weather conditions during the past physical movement associated with the record;

determining by the system a plurality of factors associated with the query, the plurality of factors including a current time, an indication whether the current day is a holiday, an indication whether it is currently daytime or nighttime, and a current plurality of weather conditions;

comparing by the system the attributes of each of the records of past physical movement to the plurality of factors associated with the query;

selecting by the system only the records of past physical movement having attributes matching the plurality of factors associated with the query;

identifying by the system a time associated with each of a plurality of instances of movement between the first location and the second location within the selected records; and determining by the system a subjective distance between the first location and the second location as an average of the identified plurality of times.

2. The computer program of claim 1, wherein the query includes a request for directions from the first location to the second location.

3. The computer program of claim 1, wherein the first location includes a location from which a user wishes to start a trip.

4. The computer program of claim 1, wherein the second location includes a destination location.

5. The computer program of claim 1, wherein the query includes a request for an optimized route between the first location and the second location.

6. The computer program of claim 1, wherein the records of past physical movement are determined by capturing location data from one or more sources.

7. The computer program of claim 1, wherein determining the subjective distance between the first location and the second location includes mapping the first location and the second location to the records of past physical movement for the plurality of users.

8. The computer program of claim 1, wherein the determined subjective distance is associated with an optimized route between the first location and the second location.

9. The computer program of claim 1, wherein the determined subjective distance is used to make one or more recommendations to the user.

10. A method, comprising:
identifying by a system including a hardware processor a first location and a second location associated with a query; and
identifying and storing by the system records of past physical movement for a plurality of different devices of a plurality of different users, where each record includes a plurality of attributes including:
a time of the past physical movement,
an indication of whether the past physical movement associated with the record occurred during a holiday,
an indication of whether the past physical movement associated with the record occurred during daytime or nighttime, and
an indication of a plurality of weather conditions during the past physical movement associated with the record;
determining by the system a plurality of factors associated with the query, the plurality of factors including a current time, an indication whether the current day is a holiday, an indication whether it is currently daytime or nighttime, and a current plurality of weather conditions;
comparing by the system the attributes of each of the records of past physical movement to the plurality of factors associated with the query;
selecting by the system only the records of past physical movement having attributes matching the plurality of factors associated with the query;
identifying by the system a time associated with each of a plurality of instances of movement between the first location and the second location within the selected records; and
determining by the system a subjective distance between the first location and the second location as an average of the identified plurality of times.

11. A system, comprising:
a hardware processor for:
identifying by the system including a hardware processor a first location and a second location associated with a query; and
identifying and storing by the system records of past physical movement for a plurality of different devices of a plurality of different users, where each record includes a plurality of attributes including:
a time of the past physical movement,
an indication of whether the past physical movement associated with the record occurred during a holiday,
an indication of whether the past physical movement associated with the record occurred during daytime or nighttime, and
an indication of a plurality of weather conditions during the past physical movement associated with the record;
determining by the system a plurality of factors associated with the query, the plurality of factors including a current time, an indication whether the current day is a holiday, an indication whether it is currently daytime or nighttime, and a current plurality of weather conditions;
comparing by the system the attributes of each of the records of past physical movement to the plurality of factors associated with the query;
selecting by the system only the records of past physical movement having attributes matching the plurality of factors associated with the query;
identifying by the system a time associated with each of a plurality of instances of movement between the first location and the second location within the selected records; and
determining by the system a subjective distance between the first location and the second location as an average of the identified plurality of times.

12. The system of claim 11, wherein the processor is coupled to memory via a bus.

* * * * *